United States Patent
Lee et al.

(10) Patent No.: US 9,014,672 B2
(45) Date of Patent: Apr. 21, 2015

(54) APPARATUS AND METHOD FOR E-MAIL POLLING IN PORTABLE TERMINAL

(75) Inventors: Chul-Hwan Lee, Seoul (KR); Youn-Taek Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2044 days.

(21) Appl. No.: 12/019,157

(22) Filed: Jan. 24, 2008

(65) Prior Publication Data
US 2008/0242269 A1    Oct. 2, 2008

(30) Foreign Application Priority Data

Mar. 28, 2007    (KR) .................. 10-2007-0030263

(51) Int. Cl.
*H04W 4/12* (2009.01)
*H04L 12/58* (2006.01)
*H04M 1/725* (2006.01)

(52) U.S. Cl.
CPC .......... *H04L 12/587* (2013.01); *H04L 12/5895* (2013.01); *H04L 51/24* (2013.01); *H04L 51/38* (2013.01); *H04M 1/72552* (2013.01)

(58) Field of Classification Search
USPC ............ 455/412, 412.1, 574, 414.1; 370/311; 709/223
See application file for complete search history.

(56) References Cited

U.S. PATENT DOCUMENTS

| | | | |
|---|---|---|---|
| 7,548,969 B2* | 6/2009 | Tripp et al. | 709/223 |
| 7,895,309 B2* | 2/2011 | Belali et al. | 709/223 |
| 2004/0128358 A1* | 7/2004 | Apfel et al. | 709/206 |
| 2005/0164703 A1* | 7/2005 | Huynh | 455/432.3 |
| 2006/0021023 A1* | 1/2006 | Stewart et al. | 726/17 |
| 2007/0162582 A1* | 7/2007 | Belali et al. | 709/223 |
| 2009/0036097 A1* | 2/2009 | Satou | 455/411 |
| 2011/0138210 A1* | 6/2011 | Belali et al. | 713/323 |

FOREIGN PATENT DOCUMENTS

| | | |
|---|---|---|
| JP | 10-003439 | 1/1998 |
| JP | 2005-086412 | 3/2005 |

* cited by examiner

*Primary Examiner* — Phuoc H Doan
(74) *Attorney, Agent, or Firm* — The Farrell Law Firm, P.C.

(57) ABSTRACT

Provided is an apparatus and method for e-mail polling in a portable terminal. In the e-mail polling method, a state of the portable terminal is detected after a predetermined time period of a first timer expires in an idle state after a periodical e-mail polling mode is set in the portable terminal. E-mail polling is performed according to the detected state of the portable terminal. The state of the portable terminal is changed into an idle state after the performance of the e-mail polling.

18 Claims, 3 Drawing Sheets

APPARATUS AND METHOD FOR E-MAIL POLLING IN PORTABLE TERMINAL

PRIORITY

This application claims priority under 35 U.S.C. §119 to an application filed in the Korean Intellectual Property Office on Mar. 28, 2007 and assigned Serial No. 2007-0030263, the contents of which are incorporated herein by reference.

BACKGROUND OF THE INVENTION

1. Field of the Invention

The present invention relates generally to an apparatus and method for e-mail polling in a portable terminal, and in particular, to an apparatus and method for performing e-mail polling in a portable terminal by connecting to an e-mail server periodically, in order to inform a user of the arrival of a new e-mail in the portable terminal.

2. Description of the Related Art

The use of portable terminals is becoming widespread with the development of the electronics and communications industries. In order to meet users' demands, portable terminals have been developed to provide a variety of additional functions in addition to basic functions. Examples of the additional functions include a phonebook function, a game function, a scheduler function, a message function, an Internet function, and an e-mail function.

In order to provide an e-mail function to a user, the portable terminal periodically polls new e-mails corresponding to the IDentification (ID) of the user. The e-mail polling includes detecting and receiving a new mail that has arrived at a connected e-mail server.

FIG. 2 is a flowchart illustrating a conventional procedure for connecting to an e-mail server in accordance with an e-mail polling period of a portable terminal.

Referring to FIG. 2, in step 201, a user of a portable terminal sets a periodical e-mail polling mode in the portable terminal. In step 203, the portable terminal drives a timer in an idle state.

In step 205, the portable terminal determines whether a predetermined time period of the timer has expired. If the predetermined time period has expired, the procedure proceeds to step 207; and if the predetermined time period has not expired, step 205 is repeated. In step 207, the portable terminal connects to an e-mail server to perform e-mail polling.

Thereafter, the procedure returns to step 203 to repeat the subsequent steps.

However, because the portable terminal connects to the e-mail server frequently in accordance with the predetermined time period set for polling new e-mails, the conventional e-mail polling method causes a large power consumption.

SUMMARY OF THE INVENTION

An object of the present invention is to substantially solve at least the above problems and/or disadvantages and to provide at least the advantages below. Accordingly, an object of the present invention is to provide an apparatus and method for e-mail polling in a portable terminal.

Another object of the present invention is to provide an apparatus and method for performing e-mail polling in a portable terminal by connecting to an e-mail server in accordance with an e-mail polling period and the state of the portable terminal, in order to inform a user of the arrival of a new e-mail in the portable terminal.

According to one aspect of the present invention, a method for e-mail polling in a portable terminal includes detecting a state of the portable terminal after a predetermined time period of a first timer expires in an idle state after a periodical e-mail polling mode is set in the portable terminal; performing e-mail polling according to the detected state of the portable terminal; and changing the state of the portable terminal into an idle state after the performance of the e-mail polling.

According to another aspect of the present invention, an apparatus for e-mail polling in a portable terminal includes a controller for detecting the state of the portable terminal after expiration of a predetermined time period of a first timer in an idle state after a periodical e-mail polling mode is set in the portable terminal, performing e-mail polling according to the detected state of the portable terminal, and changing the state of the portable terminal into an idle state after the performance of the e-mail polling; a first timer driven during a predetermined time period under the control of the controller; and a communication module for receiving e-mail according to the e-mail polling.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for performing e-mail polling in a portable terminal by connecting to an e-mail server in accordance with an e-mail polling period and the state of the portable terminal, in order to inform a user of the arrival of a new e-mail in the portable terminal.

Figure 1:
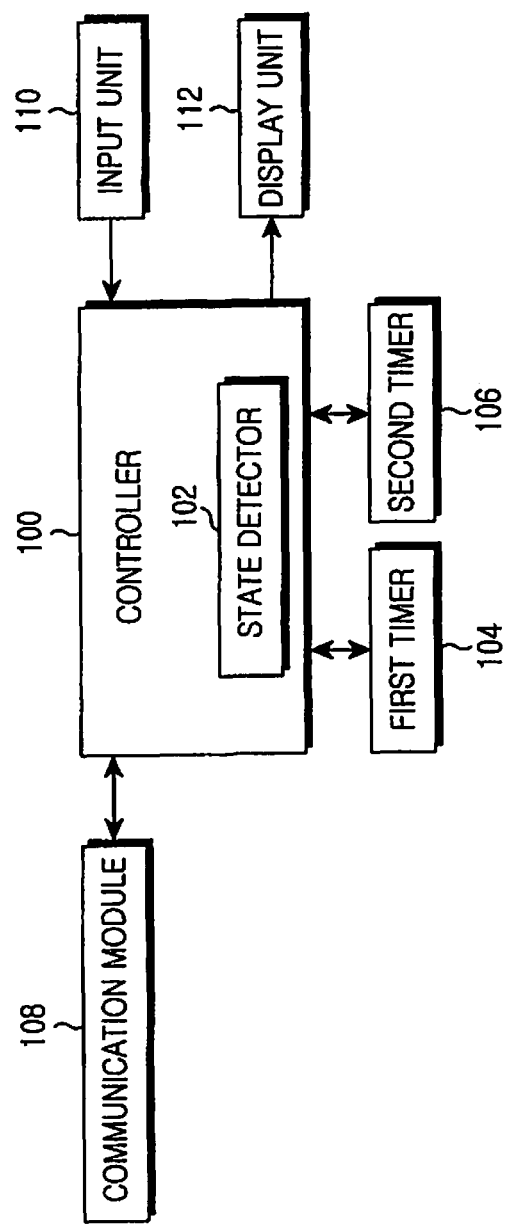
FIG. 1 is a block diagram of a portable terminal according to the present invention.
Figure 2:
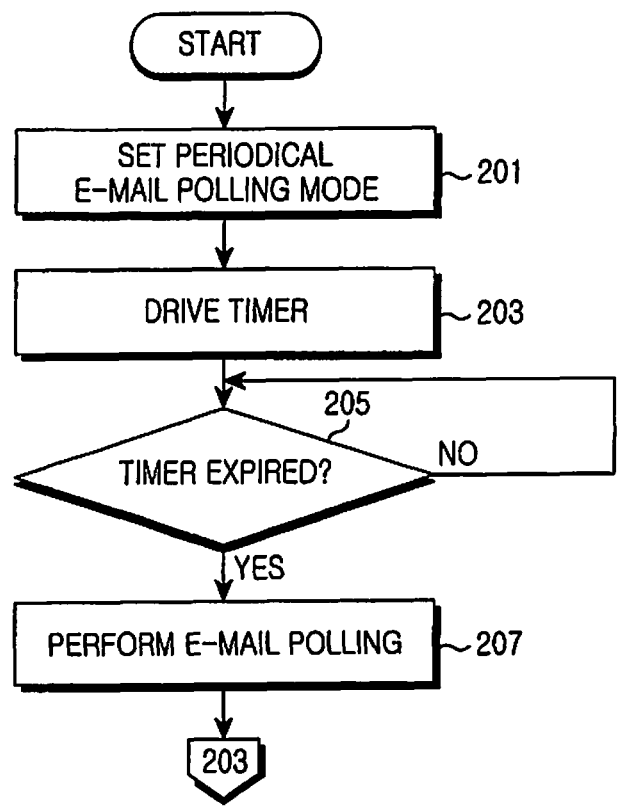
FIG. 2 is a flowchart illustrating a conventional procedure for connecting to an e-mail server in accordance with an e-mail polling period of a portable terminal.

FIG. 1 is a block diagram of a portable terminal according to the present invention.

Referring to FIG. 1, the portable terminal includes a controller (e.g., a microprocessor unit) 100, a state detector 102, a first timer 104, a second timer 106, a communication module 108, an input unit 110, and a display unit 112.

The controller 100 controls an overall operation of the portable terminal. In an embodiment of the present invention, the controller 100 includes the state detector 102 to control and process the following operations. A periodical e-mail polling mode is set to inform the user of the arrival of a new e-mail in the portable terminal. After the expiration of a predetermination time period of the first timer 104 in an idle mode of the portable terminal, the portable terminal determines whether the portable terminal is in a wake-up state. If so, the portable terminal connects to an e-mail server to perform e-mail polling; and if not (i.e., if the portable terminal is in a sleep state), the portable terminal performs e-mail polling after the expiration of a predetermined time period of the second timer 106.

Also, if the portable terminal changes into a wake-up state before the expiration of the predetermined time period of the second timer 106, the controller 100 controls the portable terminal to perform e-mail polling by connecting to the e-mail server.

According to the present invention, the first timer 104 is driven during the predetermined time period from the time when the periodical e-mail polling mode is set in the portable terminal.

According to the present invention, the second timer 106 is driven during the predetermined time period from the time when the portable terminal is in a sleep mode after the expiration of the predetermined time period of the first timer 104.

The communication module 108 processes Radio Frequency (RF) signals transmitted/received through an antenna. For example, for a transmission operation, the communication module 108 channel-codes/spreads Transmission (TX) data into a baseband signal and converts the baseband signal into an RF signal. For a reception operation, the communication module 108 converts a received RF signal into a baseband signal and despreads/channel-decodes the baseband signal into original data. According to the present invention, under the control of the controller 100, the communication module 108 connects to an e-mail server to receive a new e-mail.

The input unit 110 includes a plurality of keys for inputting numeric or character data and a plurality of function keys for setting various functions. The input unit 110 provides the control unit 200 with key input data corresponding to a key pressed by a user.

The display unit 112 displays numerals, characters, and state information that are generated during the operation of the portable terminal.

Figure 3:
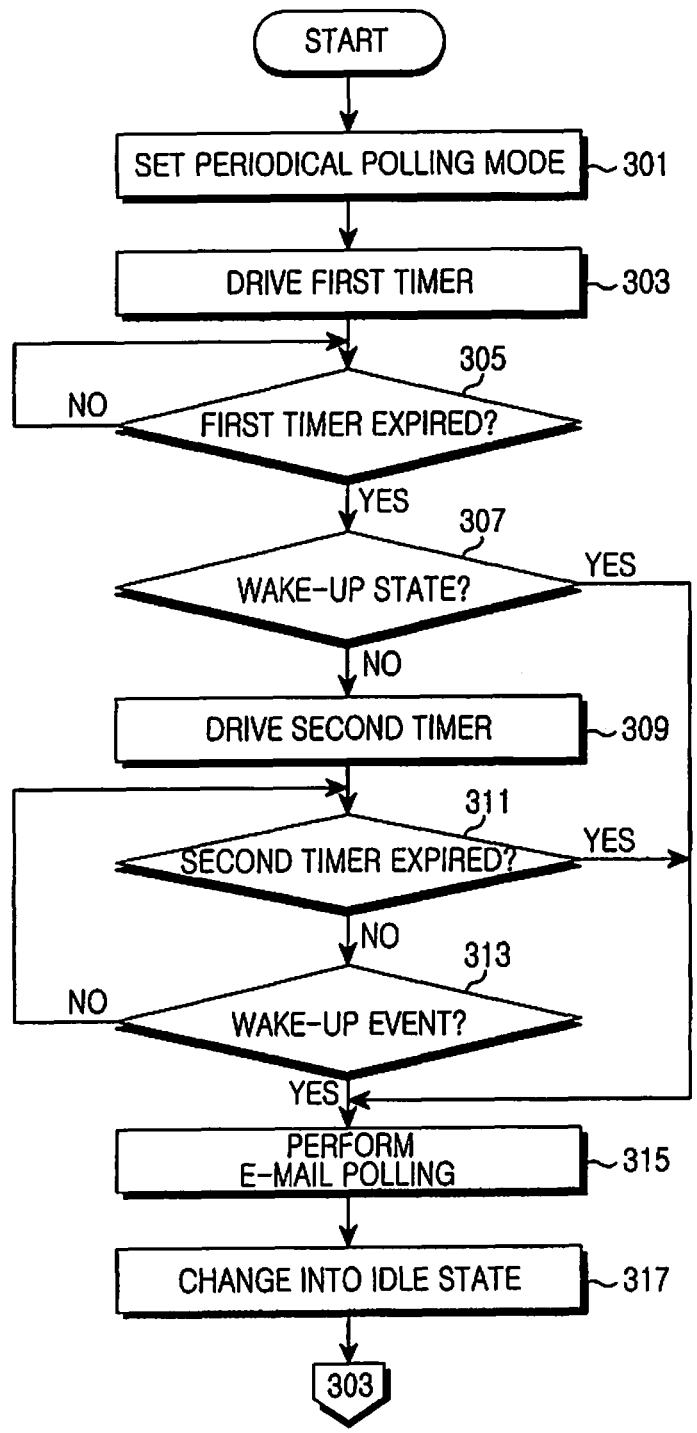
FIG. 3 is a flowchart illustrating a procedure for connecting to an e-mail server in accordance with an e-mail polling period and the state of a portable terminal according to an embodiment of the present invention.

FIG. 3 is a flowchart illustrating a procedure for connecting to an e-mail server in accordance with an e-mail polling period and the state of the portable terminal according to an embodiment of the present invention.

Referring to FIG. 3, a user sets a periodical e-mail polling mode of the portable terminal in step 301. In step 303, the portable terminal drives the first timer 104 in an idle state. The idle state is a state where the portable terminal is not connected to an e-mail server.

In step 305, the portable terminal determines whether a predetermined time period of the first timer 104 has expired. If the predetermined time period has expired, the procedure proceeds to step 307; and if the portable terminal has not expired, the procedure repeats step 305. In step 307, the portable terminal determines whether the portable terminal is in a wake-up state. If the portable terminal is in a wake-up state, the procedure proceeds to step 307; and if the portable terminal is not in a wake-up state (i.e., if the portable terminal is in a sleep state), the procedure proceeds to step 309.

In step 309, the portable terminal drives the second timer 106. The second timer 106 is driven to perform e-mail polling after a predetermined time even when the portable terminal is in a sleep state.

In step 311, the portable terminal determines whether a predetermined time period of the second timer 106 has expired. If the predetermined time period has expired, the procedure proceeds to step 315; and if the predetermined time period has not expired, the procedure proceeds to step 313. In step 313, the portable terminal determines whether a wake-up event occurs (i.e., if the portable terminal changes into a wake-up state). If a wake-up event occurs, the procedure proceeds to step 315; and if a wake-up event does not occur, the procedure returns to step 311.

In step 315, the portable terminal connects to the e-mail server to perform e-mail polling.

In step 317, the portable terminal changes into an idle state. Thereafter, the procedure returns to step 303.

The time periods of the first and second timers 104 and 106 may be set differently depending on time and day. For example, the time periods of the timers may be set to short periods during weekday-daytime hours and may be set to long periods during weekend-evening hours.

As described above, the periodical e-mail polling mode is set to inform the user of the arrival of a new e-mail in the portable terminal. After the expiration of the predetermination time period of the first timer, the portable terminal determines whether the terminal is in a wake-up state. If the terminal is in a wake-up state, the portable terminal performs e-mail polling; and if the portable terminal is not in a wake-up state (i.e., if the portable terminal is in a sleep state), the portable terminal performs e-mail polling after the expiration of the predetermined time period of the second timer. Accordingly, it is possible to reduce the power consumption of the portable terminal.

Alternate embodiments of the present invention can also comprise computer readable codes on a computer readable medium. The computer readable medium includes any data storage device that can store data that can be read by a computer system. Examples of a computer readable medium include magnetic storage media (such as Read-Only Memory (ROM), floppy disks, and hard disks, among others), optical recording media (such as Compact Disk (CD)-ROMs or Digital Versatile Disks (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for e-mail polling in a portable terminal, comprising:
   detecting whether the portable terminal is in a wake-up state or a sleep state after a predetermined time period of a first timer expires in an idle state;
   performing e-mail polling from an e-mail server in response to the detected state of the portable terminal; and
   changing the state of the portable terminal into the idle state when completing the e-mail polling,
   wherein the idle state is a state where the portable terminal is not connected to the e-mail server.

2. The method of claim 1, wherein performing the e-mail polling from the e-mail server in response to the state of the portable terminal comprises, if the portable terminal is in the wake-up state, connecting to the e-mail server to perform the e-mail polling.

3. The method of claim 2, wherein performing the e-mail polling from the e-mail server in response to the state of the portable terminal comprises:
   if the portable terminal is in the sleep state, driving a second timer for performing the e-mail polling after an elapse of a predetermined time period of the second timer; and
   changing the sleep state into the wake-up state and connecting to the e-mail server to perform the e-mail polling after an expiration of a predetermined time period of the second timer.

4. The method of claim 3, further comprising, if a wake-up event of the portable terminal occurs before the expiration of the predetermined time period of the second timer, changing the sleep state into the wake-up state and connecting to the e-mail server to perform the e-mail polling.

5. The method of claim 3, wherein the predetermined time period of the second timer is set differently depending on a time and a day.

6. The method of claim 1, wherein the predetermined time period of the first timer is set differently depending on a time and a day.

7. An apparatus for e-mail polling in a portable terminal, comprising:
   a controller for detecting whether the portable terminal is in a wake-up state or a sleep state after an expiration of a predetermined time period of a first timer in an idle state, performing e-mail polling from an e-mail server in response to the detected state of the portable terminal, and changing the state of the portable terminal into the idle state when completing the e-mail polling;
   a first timer driven during a predetermined time period under a control of the controller; and
   a communication module for receiving e-mail according to the e-mail, polling,
   wherein the idle state is a state where the portable terminal is not connected to the e-mail server.

8. The apparatus of claim 7, further comprising a second timer that, if the portable terminal is in the sleep state, is driven during a predetermined time period of the second timer under the control of the controller.

9. The apparatus of claim 8, wherein the predetermined time period of the second timer is set differently depending on a time and a day.

10. The apparatus of claim 7, wherein, if the portable terminal is in the wake-up state, the controller connects to the e-mail server to perform the e-mail polling.

11. The apparatus of claim 7, wherein the controller, after an elapse of a predetermined time period and if the portable terminal is in the sleep state, drives a second timer for performing the e-mail polling, and, after expiration of a predetermined time period of the second timer, changes the sleep state into the wake-up state and connects to the e-mail server to perform the e-mail polling.

12. The apparatus of claim 11, wherein, if a wake-up event of the portable terminal occurs before an expiration of the predetermined time period of the second timer, the controller changes the sleep state into the wake-up state and connects to the e-mail server to perform the e-mail polling.

13. The apparatus of claim 7, wherein the predetermined time period of the first timer is set differently depending on a time and a day.

14. An apparatus for e-mail polling in a portable terminal, comprising:
   means for detecting whether the portable terminal is in a wake-up state or sleep state after a predetermined time period of a first timer expires in an idle state;
   means for performing e-mail polling from an e-mail server in response to the detected state of the portable terminal; and
   means for changing the state of the portable terminal into the idle state when completing the e-mail polling,
   wherein the idle state is a state where the portable terminal is not connected to the e-mail server.

15. The apparatus of claim 14, wherein the means for performing the e-mail polling from the e-mail server in response to the state of the portable terminal comprises,
   if the portable terminal is in the wake-up state, means for connecting to the e-mail server to perform the e-mail polling.

16. The apparatus of claim 15, wherein the means for performing the e-mail polling from the e-mail server in response to the state of the portable terminal comprises:
   if the portable terminal is in the sleep state, means for driving a second timer for performing the e-mail polling after an elapse of a predetermined time period of the second timer; and
   means for changing the sleep state into the wake-up state and connecting to the e-mail server to perform the e-mail polling after an expiration of the predetermined time period of the second timer.

17. The apparatus of claim 16, further comprising, if a wake-up event of the portable terminal occurs before the expiration of the predetermined time period of the second timer, means for changing the sleep state into the wake-up state and connecting to the e-mail server to perform the e-mail polling.

18. A computer-readable recording medium having recorded thereon a program for e-mail polling in a portable terminal, the medium comprising:
   a first code segment, for detecting whether the portable terminal is in a wake-up state or a sleep state after a predetermined time period of a first timer expires in an idle state;
   a second code segment, for performing e-mail polling from an e-mail server in response to the detected state of the portable terminal; and
   a third code segment, for changing the state of the portable terminal into the idle state when completing the e-mail polling,
   wherein the idle state is a state where the portable terminal is not connected to the e-mail server.

* * * * *